US012710009B2

(12) United States Patent
Spitzer et al.

(10) Patent No.: US 12,710,009 B2
(45) Date of Patent: Aug. 18, 2026

(54) SYSTEM AND METHODS FOR STABILIZATION OF DC BUS VOLTAGE IN A HYBRID-ELECTRIC AIRCRAFT

(71) Applicant: VerdeGo Aero, Inc., Daytona Beach, FL (US)

(72) Inventors: David N. Spitzer, Port Orange, FL (US); Mark Ricklick, Port Orange, FL (US); Richard Pat Anderson, De Leon Springs, FL (US); Eric Richard Bartsch, Wilmette, IL (US)

(73) Assignee: VerdeGo Aero, Inc., Daytona Beach, FL (US)

( * ) Notice: Subject to any disclaimer, the term of this patent is extended or adjusted under 35 U.S.C. 154(b) by 60 days.

(21) Appl. No.: 18/580,815

(22) PCT Filed: Nov. 17, 2022

(86) PCT No.: PCT/US2022/050303
§ 371 (c)(1),
(2) Date: Jan. 19, 2024

(87) PCT Pub. No.: WO2023/091600
PCT Pub. Date: May 25, 2023

(65) Prior Publication Data

US 2025/0091723 A1 Mar. 20, 2025

Related U.S. Application Data

(60) Provisional application No. 63/280,585, filed on Nov. 17, 2021.

(51) Int. Cl.
*F02C 6/12* (2006.01)
*B64D 31/18* (2024.01)
(Continued)

(52) U.S. Cl.
CPC ................ *F02C 6/12* (2013.01); *B64D 31/18* (2024.01); *F02B 39/10* (2013.01); *B64D 27/33* (2024.01); *F05D 2220/764* (2013.01)

(58) Field of Classification Search
CPC ........... F02C 6/12; B64D 31/18; B64D 27/33; B64D 2221/00; F02B 39/10; F02B 33/40;
(Continued)

(56) References Cited

U.S. PATENT DOCUMENTS 2,454,038 A 11/1948 Crever
7,047,743 B1 5/2006 Stahlhut
(Continued)

FOREIGN PATENT DOCUMENTS

CN 204572186 U 8/2015
EP 3703220 A1 1/2024
(Continued)

OTHER PUBLICATIONS

Extended Search Report from European application No. 22896476.3, dated Jul. 15, 2025, 30 pp.
(Continued)

*Primary Examiner* — Muhammad Shafi
(74) *Attorney, Agent, or Firm* — Greenberg Traurig LLP

(57) ABSTRACT

A hybrid-electric genset includes a direct current (DC) bus, an engine, and an electric generator configured to receive mechanical power from the engine and generate first alternating current (AC) power. The hybrid-electric genset further includes an inverter configured to convert the first AC power to DC power and output the DC power to the DC bus. The hybrid-electric genset further includes a controller configured to control the engine to increase or decrease the AC power output by the electric generator. The DC bus is configured to attach to at least one battery pack or supercapacitor. The at least one battery pack or supercapacitor is
(Continued)

configured to maintain a nominal voltage of the DC bus approximately at a nominal battery pack voltage of the at least one battery pack.

17 Claims, 4 Drawing Sheets

(51) Int. Cl.
*F02B 39/10* (2006.01)
*B64D 27/33* (2024.01)

(58) Field of Classification Search
CPC .... F02B 37/10; F02B 37/14; F05D 2220/764; F05D 2220/40; F05D 2220/76; F05D 2220/762; B60L 2200/10; B60L 50/10; B60L 50/40; B60L 50/61; B60L 58/13; H02J 2310/44; H02J 7/1446; H02P 2101/30; H02P 9/04; H02P 29/0027; H02P 29/40; Y02T 10/12
USPC .......................................................... 701/22
See application file for complete search history.

(56) References Cited

U.S. PATENT DOCUMENTS

| | | | | |
|---|---|---|---|---|
| 8,319,369 | B2 | 11/2012 | Rozman | |
| 10,746,090 | B2 | 8/2020 | Bigbee-Hansen | |
| 11,128,251 | B1 | 9/2021 | Solodovnik | |
| 2009/0326737 | A1 | 12/2009 | Derouineau et al. | |
| 2010/0018203 | A1 | 1/2010 | Richards | |
| 2010/0148518 | A1* | 6/2010 | Algrain | F02B 63/04 290/1 R |
| 2013/0098034 | A1 | 4/2013 | Niizuma | |
| 2014/0100729 | A1* | 4/2014 | Jung | F02D 41/0007 180/65.265 |
| 2015/0183385 | A1* | 7/2015 | Iwashima | B60L 53/53 307/9.1 |
| 2016/0236790 | A1 | 8/2016 | Knapp | |
| 2018/0291807 | A1 | 10/2018 | Dalal | |
| 2019/0016280 | A1 | 1/2019 | White et al. | |
| 2020/0148373 | A1 | 5/2020 | Long | |
| 2020/0298728 | A1* | 9/2020 | Demont | B60L 50/40 |
| 2021/0131355 | A1* | 5/2021 | Szarvasy | F02C 6/20 |
| 2021/0199044 | A1 | 7/2021 | Aori | |
| 2021/0354837 | A1* | 11/2021 | Mark | H02H 7/0833 |
| 2022/0412272 | A1* | 12/2022 | Farris | F01D 15/10 |

FOREIGN PATENT DOCUMENTS

| | | | |
|---|---|---|---|
| KR | 101884574 | B1 | 8/2018 |
| WO | 2016171955 | A1 | 10/2016 |

OTHER PUBLICATIONS

International Search Report and Written Opinion issued in appl. No. PCT/US22/50260, date of mailing Feb. 23, 2023, 9 pgs.
Non-final Office Action from U.S. Appl. No. 18/580,924, dated Oct. 9, 2024, 19 pp.
Final Office Action from U.S. Appl. No. 18/580,924, dated Apr. 30, 2025, 18 pp.
ISA/US, Int'l Search Report and Written Opinion issued in appl. No. PCT/US22/50303, date of mailing Mar. 10, 2023, 10 pgs.
Extended Search Report from European application No. 22896489, dated Sep. 26, 2025, 13 pp.

* cited by examiner

160

Hybrid-Electric Genset 161
Hybrid-Electric Genset Controller 162
Engine 163
164
Electric Generator 165
Inverter 166
167
Inverter 172
Inverter 176
Battery Pack 182
Battery Pack 184
Electric Motor 174
Electric Motor 178
Aircraft Main Controller 180
Aircraft Components 170

SYSTEM AND METHODS FOR STABILIZATION OF DC BUS VOLTAGE IN A HYBRID-ELECTRIC AIRCRAFT

CROSS-REFERENCE TO RELATED PATENT APPLICATION

This application is a 371 National Stage application of International PCT Application No. PCT/US2022/050303, filed Nov. 17, 2022, which claims the benefit of U.S. Provisional Patent Application No. 63/280,585, filed Nov. 17, 2021, the entire contents of each of which are hereby incorporated by reference in their entirety.

BACKGROUND

New aircraft designs are increasingly using electric motors for propulsion for a wide variety of reasons. Electric motors have high power to weight ratios, favorable torque curves, and mechanical simplicity which all lend themselves to aerospace applications, such as for vertical takeoff and landing (VTOL) and/or fixed-wing aircraft. Electric motors use large amounts of electric power, which may require a weight optimized, reliable source of power onboard an aircraft. Hybrid electric powertrain systems are capable of delivering significantly more energy than battery packs with available battery chemistries.

SUMMARY

An illustrative hybrid-electric genset includes a direct current (DC) bus, an engine, and an electric generator configured to receive mechanical power from the engine and generate first alternating current (AC) power. The hybrid-electric genset further includes an inverter configured to convert the first AC power to DC power and output the DC power to the DC bus. The hybrid-electric genset further includes a controller configured to control the engine to increase or decrease the AC power output by the electric generator. The DC bus is configured to attach to at least one battery pack or supercapacitor. The at least one battery pack or supercapacitor is configured to maintain a nominal voltage of the DC bus approximately at a nominal battery pack voltage of the at least one battery pack.

DETAILED DESCRIPTION

Figure 1:
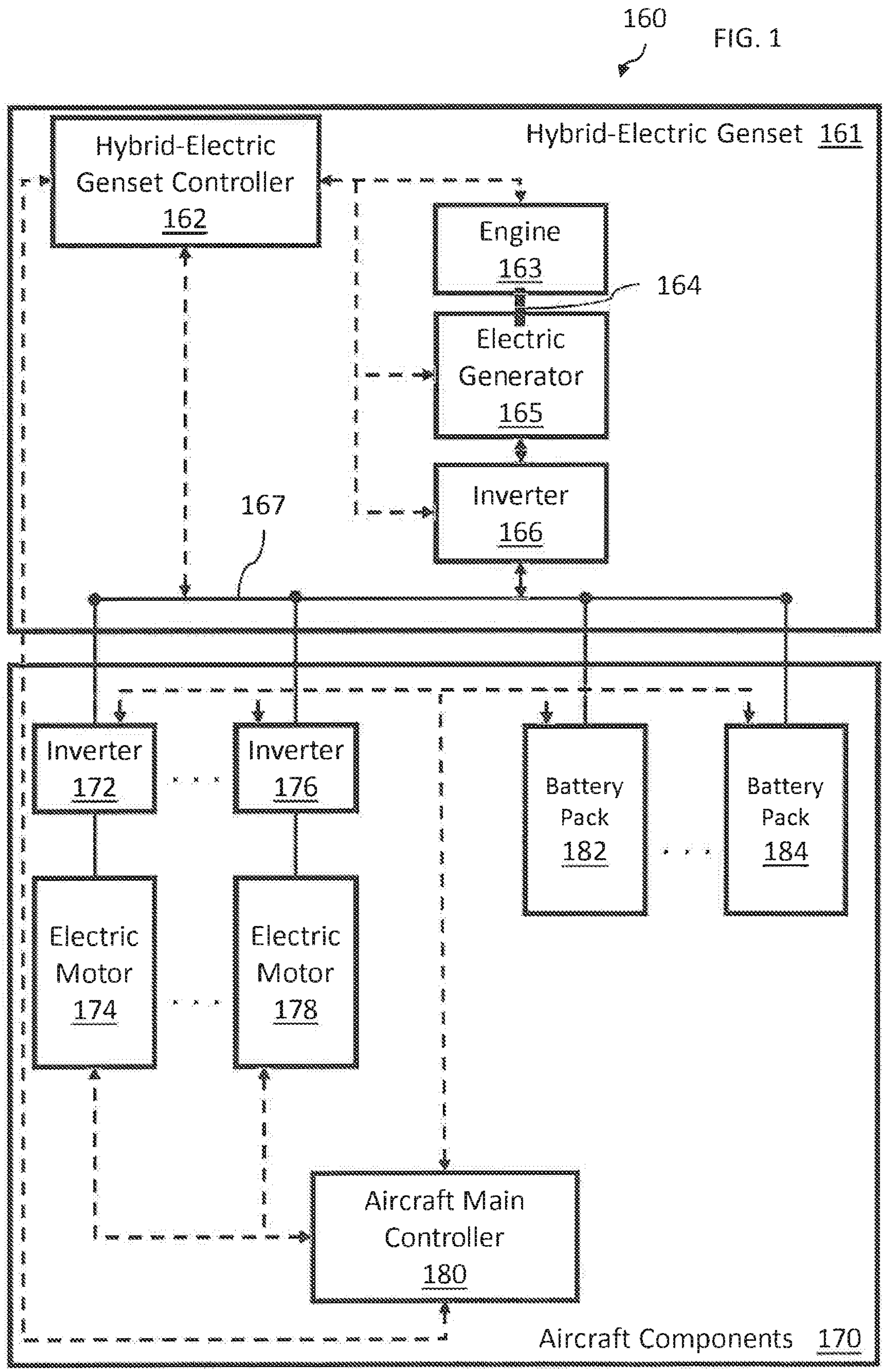
FIG. 1 is a diagrammatic view of an example system for providing a direct current (DC) bus with a stable voltage, in accordance with an illustrative embodiment.

Described herein are various embodiments for implementing a hybrid-electric aircraft. Such an aircraft may utilize a high voltage electrical bus to distribute power to various components of the aircraft, such as motors for propulsion mechanisms of the aircraft. In such a hybrid-electric aircraft, it may be desirable to stabilize the high voltage electrical bus within a specific, predetermined voltage range (e.g., around a nominal voltage level) so that the propulsion motors may perform adequately. Various embodiments described herein may specifically use a direct current (DC) bus, so maintaining a desired DC voltage range may be desirable. Advantageously, the various embodiments herein provide for efficiently maintaining a desired DC voltage range on a DC bus by connecting at least one battery or supercapacitor directly to the DC bus, and further maintaining a sufficient charge on the at least one battery or supercapacitor to maintain the desired DC voltage range on the DC bus. Such embodiments may prevent voltage spikes that may be damaging to components of a hybrid-electric or electric aircraft (e.g., electric motors and inverters for propulsion) and avoid voltage spikes or sags that may negatively impact the reliability and/or performance and safety of the aircraft or systems of the aircraft.

In electrified aviation, various embodiments of an overall architecture may include one or more electric power creation devices (e.g., an electric generator) connected via a low-impedance connection to a high voltage DC bus and feeding electrical power and energy onto that bus. In the same vehicle and attached to that same DC bus may be one or more power consuming devices (e.g., electric motors) that receive electrical power and energy from that DC bus. Various embodiments of electrified aircraft may also include energy storage devices such as battery packs or capacitors (e.g., supercapacitors), which may receive or deliver power as desired depending on bus voltage and battery pack voltage.

If a high-voltage electric generator is directly generating DC power or is operating through a passive rectifier, for example, the DC voltage created by the motor may be a function primarily of motor rotations per minute (RPM) of the shaft rotating the electric generator. A permanent magnet electric motor, for example, may create a voltage based on rotational speed (RPM). For many uses, the coupling of voltage with RPM may create an issue for motor control that limits the value of that electric motor in a system. To gain additional usefulness from a brushless motor without permanent magnets, an external voltage reference may be used to maintain a desired voltage level. A unique problem in aviation is that flight safety requires precise control of power consumers over a wide range of flight conditions (electric motors driving fans, propellers, or other devices) that may not match the characteristics of contributors (such as an electric brushless generator). If a high-voltage generator used is turning slower than expected for any reason, the bus voltage may be lower than desired and any motors on that bus may perform below expectations, which may lead to an unsafe or undesirable condition. If such a high-voltage generator is turning faster than expected, bus voltage may be high and motor performance may again be outside expected or desired values. As such, it may be desirable for applications of generators and motors sharing a common bus to design the generators and motors used accordingly. For electrified aviation, precise control of any motor(s) is desirable to provide lift, thrust, aircraft attitude, etc. for an aircraft. As such, as compared to other, non-aviation related implementations, it is desirable to have better control over a power supplied to any motor(s) (e.g., over the DC bus) by maintaining power supplied to the motor(s) at a voltage that keeps the motor(s) operating at a desired performance level. In addition, the power supplied to the motor(s) may be quickly adjustable so that a pilot or control system of an aircraft may control the motor(s) over a wide range of use as needed (e.g., provide a pilot or control system with a flexible, wide range over which they may control the motor (s)). In various embodiments, inverters may be used to regulate an output voltage of an upstream electric generator (s), which may be used to feed a high voltage bus. Inverters may also be used to precisely control downstream motors under varying load conditions.

Inverters may allow a system designer to expand an operating envelope of any motors and/or generators by controlling current. In order for these inverters to function properly, a bus voltage feeding power to the inverters may advantageously be set and maintained by other methods besides motor RPM (as voltage on a bus may be difficult to control precisely where only motor RPM is used). The maintenance of the bus voltage relates to capacitance and the expected variations in load present under all system operating conditions. If that bus has loads that are varying too rapidly or capacitance (which acts like inertia in an analogous mechanical system) that is too low, for example, then the high voltage bus and power electronic system may become unstable.

In various embodiments, bus voltage may be established and maintained using battery pack(s), capacitor(s), or any combination thereof. Such devices may add capacitance and/or electrical inertia to the bus and are passive, meaning their intended function is ruled completely by physics and may not require control or intervention (e.g., by a controller or control system). Supercapacitors (or ultracapacitors) additionally have a desirable feature of high capacitance, though they typically lack significant energy storage. Supercapacitors may respond to very rapid fluctuations with enormous power (e.g., energy over time). In short, they may provide stability to a bus for fluctuations that are relatively short in duration, low in amplitude, or where the product of those two values is relatively low. Batteries may also be desirable because they have significant capacitance for bus stability and may also store high energy. Batteries may not be able to respond to a change in voltage as quickly as a supercapacitor, as batteries often have more limited rate of power applications, particularly in charging (where discharging power capacity is often 10X or more higher than charging capacity). For example, if it is necessary to pull current off a bus to maintain a desired voltage level (e.g., charge a battery), a battery may not absorb that current as quickly as would be desired in certain embodiments (depending on the specific characteristics of a selected battery). In some embodiments, however, one or more battery packs alone may be sufficient to maintain a desired voltage level on a bus.

Accordingly, various embodiments are described herein that enable independent control of one or multiple upstream electric generators and downstream motors by adding a battery pack and/or supercapacitor bank with an appropriate design to maintain a desired voltage on a DC bus. With an architecture where the voltage and capacitance of those storage elements are directly electrically connected to the main motor control elements on the bus (and not shielded by other switches, chargers, or like devices), the battery pack and/or supercapacitor bank provide a lightweight and effective anchor or setpoint for a high voltage DC bus.

A battery pack in an aircraft may be deployed along with a hybrid-electric generation system to support system safety standards applied to flight articles. If these battery packs and/or supercapacitors are chosen not only to provide required power or energy but are also set at a correct or desired voltage and are connected to high voltage motor controllers, the battery pack and/or supercapacitor bank may provide a second and valuable benefit of bus stabilization by connecting the battery pack and/or supercapacitor bank directly to a DC bus. The battery pack and/or supercapacitor bank may also be advantageously chosen for a given aircraft such that it has a target voltage, though actual voltage on the bus may naturally fluctuate some with state-of-charge (SOC) and varying electric loads. The battery pack and/or supercapacitor bank may also be advantageously chosen so that the actual voltage is unlikely to go outside of a desired range. In instances where the actual voltage does go out of the desired range or is expected to go out of the desired range, a controller of the aircraft or a hybrid-electric genset in the aircraft may adjust the power (e.g., torque) supplied to the generator to add or reduce electric power supplied to the DC bus to maintain the voltage within a proper, desired range. RPM may further be maintained at a constant or relatively constant level or within a predetermined range. Therefore, power supplied to the generator or otherwise output to a power shaft may be adjusted by adjusting the torque output by the engine rather than through adjustment of the RPM of the output of the engine. It may further be desirable to maintain an actual voltage set point that may fluctuate at a range that remains within desired tolerances for operating electric motors or other components of an aircraft. In addition, a battery pack may advantageously serve as an auxiliary source of power to drive motors or other components of an aircraft in the event of a fault in the generator(s) or other component of a hybrid-electric genset. This may therefore add a level of system safety and fault tolerance.

FIG. 1 is a diagrammatic view of an example system 100 for providing a direct current (DC) bus with a stable voltage, in accordance with an illustrative embodiment. The system 100 includes a hybrid-electric genset 161, which includes a controller 162, an engine 163 connected to an electric generator 165 by a shaft 164, an inverter 166, and a direct current (DC) bus 167. The engine 163 may supply mechanical (e.g., rotational) power to the electric generator 165 via the shaft 164 so that the electric generator 165 may produce electric power (e.g., alternating current (AC) power). The AC power from the electric generator 165 may be converted to DC power by the inverter 166 and supplied to the DC bus 167. The inverter 166 may also be able to convert AC power from the DC bus 167 into AC power that may be used by the electric generator 165 to provide power output to a shaft (e.g., where the electric generator 165 acts as a motor to power a component of an aircraft such as a propulsion mechanism). The controller 162 may control any of the components of the hybrid-electric genset 161 (e.g., control an RPM that is output to the electric generator 165). The controller 162 may also measure characteristics of the DC bus 167, such as voltage on the DC bus and/or current flowing through the DC bus 167.

The system 100 further includes aircraft components such as inverters 172 and 176 connected to the DC bus 167, electric motors 174 and 178 connected to the inverters 172 and 176, a controller 180, and battery packs 182 and 184. In various embodiments, the aircraft components may have supercapacitors instead of or in addition to the battery packs 182 and 184. In various embodiments one or more battery packs and/or supercapacitors may be included as part of the hybrid-electric genset 161 and connected directly to the DC bus within the hybrid-electric genset 161, whether or not the aircraft components have separate batteries and/or supercapacitors. While FIG. 1 shows multiple connections running from the DC bus 167 of the hybrid-electric genset 161 to the aircraft components 170, other configurations are contemplated herein, such as a single connection to another bus of the aircraft components 170, or where the DC bus 167 itself is part of the aircraft components 170, etc. The controller 180 may be in communication with the control 162. In this way, the controller 180 may transmit information to the controller 162 about how the inverters 172 and 176, electric motors 174 and 178 are being controlled/used at a present time or how the controller plans to use those components in the future. The controller 180 may also monitor and measure the state of the battery packs 182 and 184 and send information related to that state (e.g., any measurement related to the charge state, voltage, current flowing into or out of battery, etc.) to the controller 162. In embodiments where a battery or supercapacitor is included in the hybrid-electric genset 161, the controller 162 may monitor such components for similar information.

The battery packs 182 and 184 may represent a single battery module, or may be two or more separable modules. Regardless of form factor, the battery cells, packs, modules, etc. may combine to maintain a DC bus voltage as described herein. For example, in an example aircraft, the batteries may maintain a nominal voltage, such as 400 volts (V), 800 V, etc. For example, a battery system may be one or more batteries connected in series to set a voltage of the battery system and the DC bus. For example, a battery module may be 200 volts (V), and so one battery module may be used to have a 200 V system, two modules in series to have a 400 V system, four modules in series to have an 800 V system, etc. Those groups of modules may be further connected in parallel with other groups of battery modules to increase the power available from a battery system at a desired voltage. The batteries may also be designed or selected to have a desired capacitance so that the battery system can effectively maintain a nominal voltage on the DC bus as described herein even while power is being input to the DC bus (e.g., generated by a motor/generator) and/or output from the DC bus (e.g., consumed by an electric motor of a propulsion system). For example, a set of four battery modules connected in series for an 800 V system may have a capacitance of 29 Farads (F), such that batteries serve as a capacitor connected to the DC bus. If two sets of four series-connected battery modules are connected in parallel to provide more power in an 800 V system, those two sets together may have a capacitance of 58 F. If three sets of four series-connected battery modules are connected in parallel to provide even more power in an 800 V system, those two sets together may have a capacitance of 87 F. As such, in various examples, different configurations of batteries may provide anywhere from 20 to 110 Farads (F) of capacitance to a DC bus, or much higher capacitances than 110 F, as the examples described herein are merely illustrative. In this way, the batteries may be sized and designed to provide a particular capacitance for an aircraft DC bus as desired.

In various embodiments, fewer, additional, or different elements to those shown in FIG. 1 may be included in an aircraft.

Figure 2:
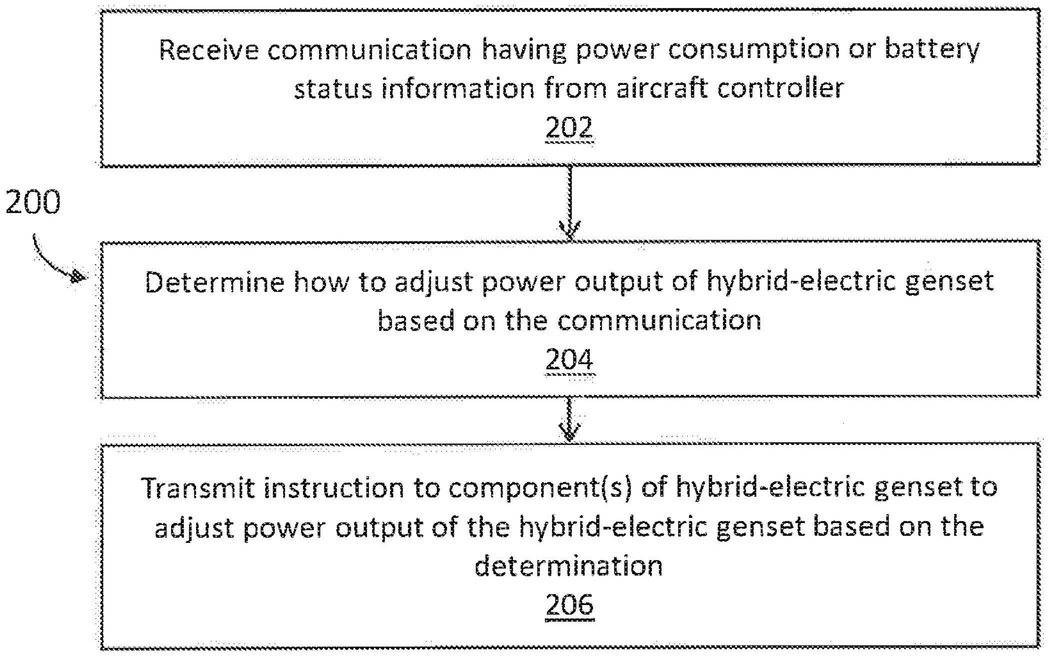
FIG. 2 is a flow chart illustrating an example method for maintaining a stable DC bus voltage based on communications from an aircraft-level controller, in accordance with an illustrative embodiment.

FIG. 2 is a flow chart illustrating an example method 200 for maintaining a stable DC bus voltage based on communications from an aircraft-level controller, in accordance with an illustrative embodiment. At an operation 202, a controller (e.g., the controller 162 of FIG. 1) may receive a communication that includes power consumption or battery status information from an aircraft controller (e.g., the controller 180 of FIG. 1). The power consumption information may relate to how power is currently being used by inverters or electric motors, for example, of an aircraft. The power consumption information may also relate to how will be used by the inverters or electric motors of an aircraft (e.g., information on how the controller is intends to increase or decrease power supplied to motors at a specified time in the future). The battery status information may include a charge state, actual voltage of, and/or current flowing into or out of the batteries or supercapacitors of a system.

At an operation 204, a controller may therefore be able to determine how a power output of a hybrid-electric genset should be adjusted to maintain a desired voltage range on a DC bus. For example, if a battery's charge level is too low such that it is in danger of not being able to maintain a desired voltage, the controller may transmit instructions at an operation 206 to increase the power output of the hybrid-electric genset so that there is sufficient power to charge the battery. In another example, if a motor of the aircraft is currently using or is expected to require significantly more power than is currently being used, the controller may transmit instructions at an operation 206 to increase power output of the hybrid-electric genset. The power output may also similarly be decreased. In either instance, the controller may adjust this overall power output to the DC bus by varying the RPM supplied to an electric generator by an engine. As such, while the battery packs and supercapacitors may reduce a need to provide real time adjustments to power output of a hybrid-electric genset, as the battery packs and/or supercapacitors may maintain the DC bus at a desired voltage level, some control or adjustment of the RPM and therefore output power to the DC bus may still be desirable in various embodiments.

Figure 3:
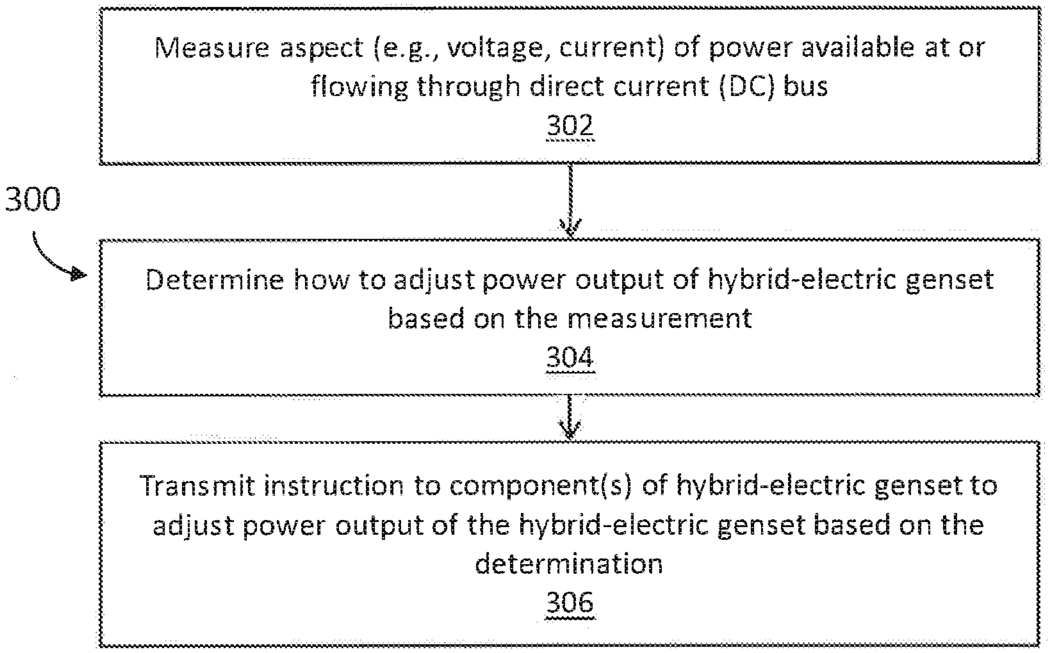
FIG. 3 is a flow chart illustrating an example method for maintaining a stable DC bus voltage based on measurements by a hybrid-electric genset-level controller, in accordance with an illustrative embodiment.

FIG. 3 is a flow chart illustrating an example method 300 for maintaining a stable DC bus voltage based on measurements by a hybrid-electric genset-level controller, in accordance with an illustrative embodiment. The method 300 is similar to the method 200, except it contemplates measurements that may be made by a hybrid-electric genset controller itself (e.g., the controller 162), rather than receiving such measurements or information from another controller (e.g., an aircraft system-wide controller such as the controller 180 of FIG. 1).

At an operation 302, aspects of power available at or flowing through a DC bus is measured by the controller. If the DC bus is measurable by a system-wide aircraft controller, the operation 302 may be carried out by the system-wide aircraft controller as well. Similarly, if batteries and/or supercapacitors are packaged as part of a hybrid-electric genset rather than being positioned as part of an overall aircraft system, the controller may at operation 302 also measure a state of the batteries/supercapacitors (e.g., charge state, current, voltage, etc.). At an operation 304, the controller determines how power output of the hybrid-electric genset should be adjusted based on the measurements. For example, if a DC bus voltage is getting close to going outside of a desired range, it may be desirable to transmit instructions at an operation 306 to the components of the hybrid-electric genset to adjust power output of the hybrid-electric genset based on the determination at the operation 304 to ensure the DC bus voltage stays within a desired voltage range.

Figure 4:
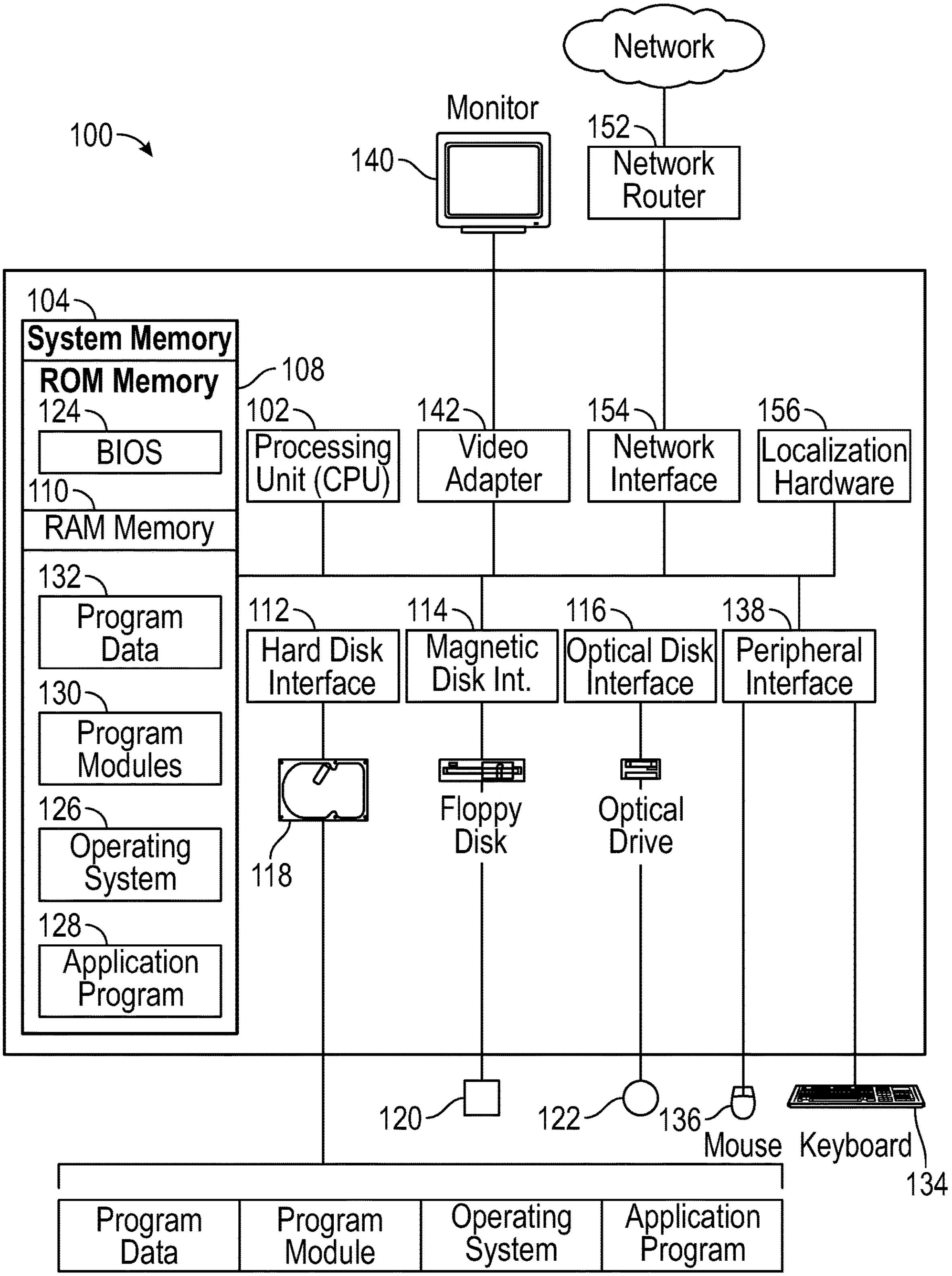
FIG. 4 is a diagrammatic view of an example of a computing environment, in accordance with an illustrative embodiment.

FIG. 4 is a diagrammatic view of an example of a computing environment that includes a general-purpose computing system environment 100, such as a desktop computer, laptop, smartphone, tablet, or any other such device having the ability to execute instructions, such as those stored within a non-transient, computer-readable medium. Various computing devices as disclosed herein (e.g., the controller 162, the controller 180, or any other computing device in communication with those controllers that may be part of other components of an aircraft) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In some instances, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

In an illustrative embodiment, any of the operations described herein may be implemented at least in part as computer-readable instructions stored on a computer-readable medium or memory. Upon execution of the computer-readable instructions by a processor, the computer-readable instructions may cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or from practice of the disclosed embodiments. It is intended that the scope of the invention be defined by the claims appended hereto and their equivalents.

We claim:

1. A system comprising:
a hybrid-electric genset comprising:
a direct current (DC) bus;
an engine;
an electric generator configured to receive mechanical power from the engine and generate first alternating current (AC) power;
a first inverter configured to convert the first AC power to DC power and output the DC power to the DC bus; and
a first controller configured to control the engine to increase or decrease the AC power output by the electric generator; and
aircraft components comprising:
an electric motor;
a second inverter configured to receive DC power from the DC bus and convert the DC power to second AC power for use by the electric motor;
at least one battery pack connected to the DC bus, wherein the at least one battery pack is configured to maintain a nominal voltage of the DC bus approximately at a nominal battery pack voltage of the at least one battery pack; and
a second controller in communication with the first controller,
wherein the first controller is configured to receive a communication from the second controller comprising information about at least one of charge status of the at least one battery pack, present power consumption of the electric motor or estimated future power consumption of the electric motor.

2. The system of claim 1, wherein the first controller is configured to determine how to adjust the engine to achieve a desired power output of the hybrid-electric genset based on the communication.

3. The system of claim 2, wherein the first controller is further configured to adjust an output of the engine to achieve the desired power output.

4. The system of claim 1, wherein the first controller is configured to receive a measurement of a characteristic of power on the DC bus or passing through the DC bus.

5. The system of claim 4, wherein the characteristic is an actual voltage of the DC bus or a current flowing through the DC bus.

6. The system of claim 4, wherein the first controller is configured to determine how to adjust the engine to achieve a desired power output of the hybrid-electric genset based on the measurement.

7. The system of claim 6, wherein the first controller is further configured to adjust an output of the engine to achieve the desired power output.

8. The system of claim 1, wherein the DC power is first DC power, and further wherein the hybrid-electric genset further comprises a third inverter configured to receive second DC power from the DC bus and convert the second DC power to third AC power for use by the electric generator.

9. The system of claim 1, wherein the electric motor is configured to drive a propulsion mechanism of an aircraft.

10. The system of claim 1, wherein the hybrid-electric genset and the aircraft components are each installed on a single aircraft.

11. The system of claim 1, wherein the at least one battery pack is electrically connected directly to the DC bus.

12. The system of claim 1, wherein the at least one battery pack has a nominal capacitance of 29 Farads (F), 58 F, or 87 F.

13. A system comprising:
a direct current (DC) bus;
an engine;
an electric generator configured to receive mechanical power from the engine and generate first alternating current (AC) power;
a first inverter configured to convert the first AC power to DC power and output the DC power to the DC bus; and
a controller configured to control the engine to increase or decrease the AC power output by the electric generator,
a second inverter configured to receive DC power from the DC bus and convert the DC power to second AC power for use by an electric motor of an aircraft,
wherein the DC bus is configured to attach to at least one battery pack or supercapacitor,
wherein the at least one battery pack or supercapacitor is configured to maintain a nominal voltage of the DC bus approximately at a nominal battery pack voltage of the at least one battery pack, and
wherein the DC bus is further configured to attach to at least one electric motor configured to supply power to a propulsion mechanism of an aircraft.

14. The system of claim 13, wherein the controller is a first controller configured to:

receive a measurement of a characteristic of power on the DC bus or passing through the DC bus; or receive a communication from a second controller comprising information about at least one of charge status of the at least one battery pack, present power consumption of the electric motor, or estimated future power consumption of the electric motor.

15. The system of claim 14, wherein the controller is further configured to adjust an output of the engine to achieve a desired power output based on the measurement or the communication.

16. A method of controlling voltage of a DC bus of an aircraft comprising:

connecting at least one battery pack or supercapacitor to the DC bus, wherein the at least one battery pack or supercapacitor is electrically directly connected to the DC bus;

controlling, by a controller, mechanical power output by an engine to an electric generator, wherein the electric generator outputs first alternating current (AC) power from the mechanical power output of the engine;

converting, by a first inverter, the first AC power from the electric generator to direct current (DC) power;

outputting the DC power from the first inverter to the DC bus;

controlling, by the controller, a second inverter configured to convert the DC power from the DC bus to second AC power and supplying the second AC power to drive an electric motor of the aircraft, wherein at least one battery pack or supercapacitor is configured to maintain a nominal voltage of the DC bus approximately at a nominal battery pack voltage of the at least one battery pack; and determining:

that the second AC power used by the electric motor is presently above or will be above a predetermined threshold; or that an actual voltage of the DC bus or an actual current flowing through the DC bus is outside of a predetermined desirable range.

17. The method of claim 16, further comprising adjusting, by the controller, the mechanical power output of the engine to achieve a desired power output based on the determination:

that the second AC power used by the electric motor is presently above or will be above the predetermined threshold; or that the actual voltage of the DC bus or the actual current flowing through the DC bus is outside of the predetermined desirable range.

* * * * *